Figure 1:
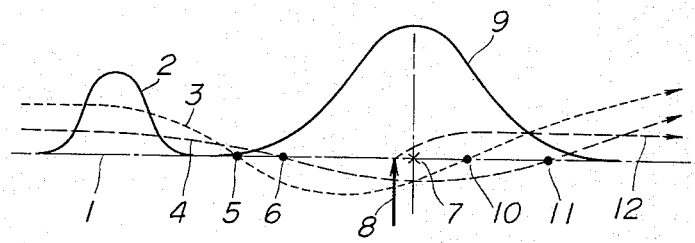

March 9, 1965  SHIGEO SUZUKI  3,173,005
MAGNETIC OBJECTIVE LENS FOR AN ELECTRON MICROSCOPE
Filed Feb. 14, 1961

United States Patent Office 3,173,005
Patented Mar. 9, 1965

3,173,005
MAGNETIC OBJECTIVE LENS FOR AN ELECTRON MICROSCOPE
Shigeo Suzuki, 180 6-chome, Yutaka-machi, Shinagawa-ku, Tokyo, Japan
Filed Feb. 14, 1961, Ser. No. 89,237
Claims priority, application Japan, Feb. 22, 1960, 35/5,228
1 Claim. (Cl. 250—49.5)

This invention relates to new and useful improvements in objective lenses of electron microscopes.

As generally known, the spherical and chromatic aberration coefficients in the electron miscoscope are smaller, when the intensity of the lens field is stronger near the specimen and the focal length is smaller. Therefore it is naturally desirable that the specimen be placed near the center of the lens. However, the position of the specimen has so far been chosen or placed on the side of the electron source with respect to the center of the lens which focuses the image of the specimen, in order to utilize the lens function more efficiently. However, when the inside of the lens is made a vacuum, the focal length is always shortened owing to the spherical aberration, and the cross-over of the off-axial electron beams is formed always nearer the electron source than that of the paraxial beams. The distance between them increases rapidly at a rate proportional to the cube of the distance from the beam to the axis. Therefore, if the specimen is placed near the center of the lens in order to reduce the spherical and chromatic aberration coefficients, the off-axial beams reach the center part of the specimen and mix with the paraxial beams. Thus the image becomes obscure owing to the large aberration, which consequently requires the very small aperture for the clear image. However, such a small aperture reduces the visual field and brings about difficulties in manufacturing the maintenance of the aperture, which is far from the practical use.

In the past, some experiments have been made, wherein the cross-over is formed before the specimen by a condenser lens. However, since a condenser lens is placed very far from the objective lens as compared with its focal length, the opening angle of the brilliant area of the condenser, seen from the objective lens is very small and, on the other hand, the image is considerably large. Therefore, the electron beams spread over the whole central area of the objective lens from the very small brilliant area of the condenser and form practically parallel beams. Furthermore, when the distance between objective and condenser lenses is comparable to the focal length of the objective lens, the difference between positions of focal point of the paraxial and off-axial beams by the condenser lens increases by the spherical aberration of the condenser lens itself with a rate proportional to the square of the focal length, and consequently the off-axial beams reach the central part of the specimen. As a result, the aperture of less than 0.01 mm. in diameter is necessary as in the former case.

The present invention does away with the disadvantages above mentioned and is characterized in that the specimen is placed in the lens field nearer the image with respect to the center of the objective lens and the cross-over is formed both before and behind the specimen by the intensive converging function of the lens; consequently, a highly efficient electron microscope is obtainable, which is very high in the magnification by the objective lens and very small in the chromatic aberration and spherical aberration, for the disturbance owing to the off-axial beams can be eliminated and only the paraxial beams can be used.

According to the invention, since the specimen can be placed near the center of the lens without disturbances by the off-axial beams, the spherical and chromatic aberrations can be made very small and the very clear image can be projected on the screen. Furthermore, when the specimen is placed on the electron source side with respect to the lens center as in the conventional way, a considerable distance is necessary between the specimen and the lens edge of the image side because of the construction of the lens and, consequently, the spherical and chromatic aberrations cannot be reduced less than a certain level, for there is a limit in the focal length no matter how highly the lens field may be intensified; however, since the specimen can be placed sufficiently close to the lens edge on the image side in the present invention, the above points have been also much improved.

Figure 2:
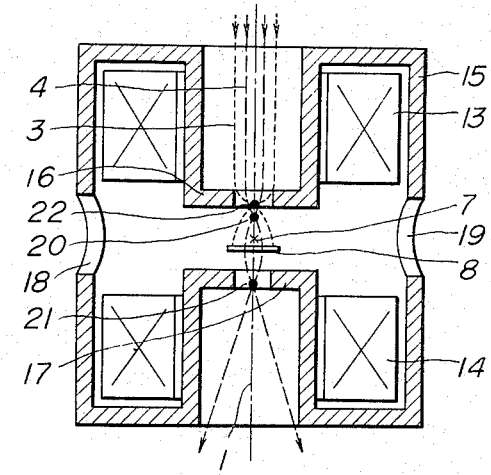
Figure 3:
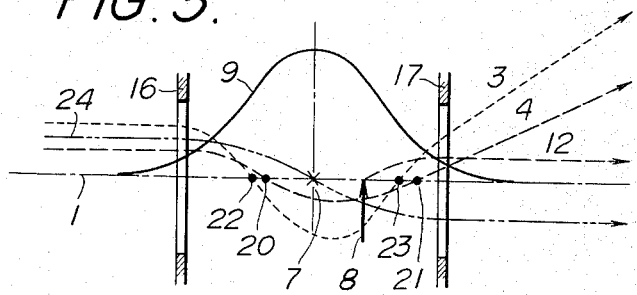

These and other features and details of the construction and operation of the invention are hereinafter fully set forth and described with reference to the accompanying drawings, in which:

FIG. 1 is a diagram of the lens field and path of electron beam in a conventional electron microscope in which the cross-over is formed in front of the specimen by the condenser lens, FIG. 2 is a vertical section of the magnetic lens of the electron microscope according to the invention, FIG. 3 is a diagram of the lens field and path of electron beam in the electron microscope according to the invention.

FIG. 1 shows the field intensity of the lens and the paths of electrons with the axis of the microscope 1 as the abscissa. The off-axial beam 3 and paraxial beam 4 form the cross-overs at the points 5 and 6 by the field of the condenser lens 2 respectively, penetrate the specimen 8 which is placed before the center of the objective lens 7, again form the cross-overs at the points 10 and 11 by the field of the objective lens 9, and finally travel toward the screen; and the electron beam 12 which passes the center of the specimen 8 is focused on the axis. Thus, the enlarged image is projected on the screen. In this case, however, since the distance between cross-overs 5 and 6 is large, the off-axis beam 3 and paraxial beam 4 are projected on almost the same spot of the specimen and the clearness of the image is disturbed. This disadvantage cannot be eliminated, unless the condenser and objective lenses are made in one body. The present invention is to eliminate the above disadvantage by using one strong objective lens and forming cross-overs both before and behind the specimen.

FIG. 2 shows one embodiment in which the present invention is applied to the magnetic lens. The magnetic poles 16 and 17 are connected by the armature 15 which surrounds the coils 13 and 14, and the objective lens is formed between them. On the outside of the armature are holes 18 and 19 for inserting the specimen and the specimen 8 is placed inside the objective lens. The electron beams travel from the above into the lens, as is indiacted with arrows, penetrate the specimen 8 and project the enlarged image of the specimen on the screen which is below the figure. This specimen 8 is put below the center of the objective lens 7, namely on the side of the image. The paraxial beam 4 which travels near the axis 1 of the electron microscope forms the cross-overs at the points 20 and 21 on both sides of the specimen, and the off-axial beam 3 which travels comparatively far from the axis 1 forms the cross-over at the point 22 which is above the point 20. Therefore, the off-axial beam 3 reaches only the outer part of the specimen and makes no disturbance on the clearness of the image.

FIG. 3 shows the electron paths and the field intensity of the lens in the same example as having the axis 1 of the microscope in the abscissa. The point 23 shows the position where the off-axial beam 3 forms the cross-over behind the specimen 8. The center 7 of the lens is the position of the cross-over of the beam coming parallel to the axis as shown by the dot-dash or chain line when the field intensity is so adjusted that the said parallel beam becomes parallel again to the axis after forming the only one cross-over. Therefore, since the specimen 8 is placed nearer the image with respect to the center 7 of the lens adjusted in such a way, and the electron beam 12 passing the center of the specimen is to be focused, the cross-over of the electron beam 4 coming parallel to the axis must be formed at the symmetrical point 20 of the specimen 8 with respect to the center 7. Furthermore, when the lens functions on the electron source side and on the image side with respect to the point 20 are compared with each other, naturally the function is stronger on the image side; therefore this electron beam forms the second cross-over after it passes the specimen 8 at the point 21, and the cross-over of the off-axial beam 3 is formed at the point 22, which is nearer the electron source than that of the paraxial beam owing to the spherical aberration. Consequently, at least on the specimen side of the point 20, the off-axial beam 3 travels always outside of the paraxial beam 4 and reaches the specimen on its comparatively outer part. In the usual lens when the width of the electron beam is limited to 0.1 mm., the distance between the points 20 and 22 becomes 0.1 mm.; then the off-axial beam is always outside of the paraxial beam when it reaches the specimen, and the disadvantageous point that the clearness of the image of the central part of the specimen is disturbed, can be eliminated.

While a particular embodiment of the present invention has been illustrated and described herein, it is not intended to limit the invention to such disclosure and changes, and modifications may be made therein and thereto within the scope of the claim.

Having thus described the invention what is claimed as new and desired to be secured by Letters Patent is:

A magnetic lens for use in an electron miscroscope having an electron source, said lens comprising a pair of axially spaced poles having pole faces which are spaced apart a substantial distance axially of said lens, a pair of axially spaced coils, each of said coils embracing a respective one of said poles, the axial spacing of said pole faces being of the order of the axial spacing of said coils, an armature interconnecting said poles and including a cylindrical wall exteriorly embracing said coils, and substantially enclosing the space therebetween, an objective lens formed between said pole faces and having an electron source facing side, an image facing side and an axis having a midpoint halfway between said pole faces; said armature cylindrical wall having access openings therein for inserting a specimen within the objective lens and on the image facing side of the objective lens with respect to the midpoint of the axis thereof, the strong converging action of said objective lens causing the paraxial and off axial beams from the electron source to cross the axis of said objective lens before said axis midpoint, and before the specimen, toward the electron source facing side of said objective lens, with the paraxial beam which travels nearer the axis of the microscope crossing the axis of said objective lens on both sides of said specimen, the paraxial beam having a first axis crossing point on the electron source facing side of said midpoint of the axis of said objective lens and spaced from said midpoint a distance substantially equal to the spacing of the specimen, located, with respect to said midpoint, toward the image facing side of said objective lens, from said midpoint, and a second axis crossing point beyond the specimen and toward the image side of the lens, and the strong converging action of said objective lens causing the off axial beam, which travels at ag reater distance from the axis of the microscope, to cross the axis of said objective lens at a first point which is at a greater distance from said midpoint toward the electron source facing side of said objective lens than is said first axis crossing point of the paraxial beam, and at a second point spaced substantially from said axis midpoint, and beyond the specimen, toward the image facing side of the lens, whereby the off axial beam, for the major part of the distance between its crossing points and while passing through the specimen, is laterally outside of the paraxial beam, and whereby the off axial beam passes through only the peripherally outer portion of the specimen.

References Cited in the file of this patent
UNITED STATES PATENTS

| | | |
|---|---|---|
| 2,220,973 | Marton | Nov. 12, 1940 |
| 2,851,611 | Von Ardenne | Sept. 9, 1958 |
| 2,939,955 | Rommerts | June 7, 1960 |